United States Patent Office 3,448,141

Patented June 3, 1969

3,448,141

UNSYMMETRICAL DERIVATIVES OF DJENKOLIC ACID

Bernard Marinier, Laval des Rapides, Quebec, Canada, assignor to Frank W. Horner Limited, Mount Royal, Quebec, Canada, a Canadian company No Drawing. Filed Apr. 19, 1967, Ser. No. 631,855

Int. Cl. C07c *149/20;* A61k *27/00*

U.S. Cl. 260—481 5 Claims

ABSTRACT OF THE DISCLOSURE

A class of compounds derived from djenkolic acid, useful as anti-inflammatory and anti-edema agents. Representative compounds include monocarbobenzoxy djenkolic acid, its dimethyl ester and the non-toxic acid salts thereof.

The present invention relates to novel compounds derived from djenkolic acid. More particularly, the invention relates to certain novel compounds derived from djenkolic acid which are useful as anti-inflammatory and anti-edema agents.

Djenkolic or jenkolic acid, chemically (methylene dithio)-3,3'-dialanine, is an amino acid which was originally isolated from djenkol beans in 1935 and which has the following structural formula:

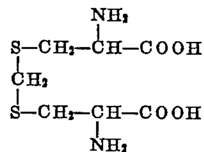

The novel derivatives of the present invention are selected from the group consisting of compounds having the following formula:

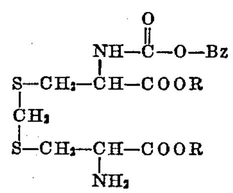

wherein R is hydrogen or methyl, and non-toxic acid salts thereof.

The compounds of the present invention can be conveniently prepared by using djenkolic acid as the starting material.

Monocarbobenzoxy djenkolic acid is obtained by reacting djenkolic acid with one molar equivalent, or less, of carbobenzoxy chloride. The dimethyl ester is obtained by reacting the monocarbobenzoxy djenkolic acid with 2,2-dimethoxypropane and hydrochloric acid.

The following examples illustrate in detail the preparation of the compounds of the present invention.

EXAMPLE 1

*Preparation of monocarbobenzoxy djenkolic acid hydrochloride*

There were dissolved 10.2 g. (.04 mol) of djenkolic acid, prepared according to the method of Armstrong and Du Vigneaud, J. Biol. Chem., 168, 373 (1947), in 104 ml. of 1 N sodium hydroxide.

To the resulting solution, cooled to a temperature of 0° C. and well stirred, there was added dropwise, over a period of 30 minutes, 4.08 g. (0.024 mol) of carbobenzoxy chloride.

Stirring is continued for two hours at 0° C. and for two additional hours at room temperature. The solution is then washed twice with 50 ml. of ether, acidified with 6 N hydrochloric acid to pH 5.8 and allowed to stand for one hour at a temperature of 0° C.

The precipitate, unreacted djenkolic acid, is removed by filtration and the filtrate is acidified with 6 N hydrochloric acid to pH 2.5 and allowed to stand in a refrigerator for about 16 hours.

The resulting precipitate is removed by filtration, dried, and extracted twice with 50 ml. of boiling ethyl acetate. There was obtained an insoluble residue of monocarbobenzoxy djenkolic acid hydrochloride, M.P. 158–159° C., which, on recrystallization from water, yielded 4.21 g. (25%) of product, M.P. 163–164° C. $[\alpha]_D^{25}$ −31° (*C*=1, dimethylformamide).

Further recrystallization yielded an analytical sample, M.P. 164–166° C.

Analysis calculated for $C_{15}H_{21}N_2O_6S_2Cl$: C, 42.39; H, 4.98; N, 6.59; S, 15.09. Found: C, 42.84; H, 5.00; N, 6.74; S, 14.68.

EXAMPLE 2

*Preparation of dimethyl monocarbobenzoxy-djenkolate hydrochloride (111)*

To 150 ml. of 2,2-dimethoxypropane there is added 6.37 g. (0.015 mol of monocarbobenzoxy-djenkolic acid hydrochloride (11) and to the resulting suspension there is added 15 ml. of concentrated hydrochloric acid. The solid dissolves and the solution is allowed to stand at room temperature for 16 hours, whereupon it turns black. The solvent is then removed under reduced pressure and the last traces thereof are removed by the addition of minor amounts of methanol and removal thereof under reduced pressure. The resulting solid is recrystallized from methanol-ether to give 5.71 g. (85%) of material, M.P. 138.5–140° C., $[\alpha]_D^{25}$ −61° (*C*=1, dimethylformamide).

After several recrystallizations, there is obtained an analytical sample melting at 140–141° C.

Analysis calculated for $C_{17}H_{25}N_2O_6S_2Cl$: C, 45.07; H, 5.56; N, 6.18; S, 14.17. Found: C, 44.85; H, 5.52; N, 6.39; S, 14.46.

The anti-inflammatory activity of representative compounds was determined by the cotton pellet granuloma test.

Albino rats, 27 to 30 days old, were bilaterally adrenalectomized under ether anesthesia (day one) and two sterile cotton balls, each weighing 5±1 mg., were inserted subcutaneously in each test animal. From the time of surgery, the test animals were maintained on a commercial complete diet, but 0.9% saline was substituted for drinking water.

The test compounds were administered on the second, third and fourth day suspended in a 1% Tween solution. Controls received the same volume of 1% Tween solution minus the test compound.

In the afternoon of the fifth day, the test animals were sacrificed with chloroform and the granuloma surrounding the cotton pellets was removed, dried at 37° C. for four days and weighed. The dry granuloma weight was obtained by difference from the original dry weight.

The pooled results are set forth in Table I. While rats from two strains (Romain Robidoux and Charles River) were used in the experiments, the results obtained in the controls and in tests using monocarbobenzoxy djenkolic acid hydrochloride were not found to be statistically different between strains and were pooled together.

When testing the dimethyl monocarbobenzoxy-djenkolate hydrochloride, statistically significant differences were found between the responses from the two strains of rats. Therefore, each experiment was evaluated against the proper controls.

As is apparent from the results set forth hereinbefore, the compounds of the invention show significant antiinflammatory activity.

The anti-edema activity was determined by the compounds' ability to reduce edema produced in paws of rats by the injection of dextran.

TABLE I.—ANTI-INFLAMMATORY ACTIVITY

| Compound | Dose (mg./kg.) | Route of administration | Number of pellets | Weight of granuloma (mg.) (±standard deviation) |
|---|---|---|---|---|
| None | | Subcutaneous | 250 | 11.7±3.6 |
| Monocarbobenzoxy djenkolic acid hydrochloride. | 25 | do | 20 | 7.0±1.8 |
| Do | 50 | do | 10 | 7.2±2.1 |
| Do | 300 | Oral | 10 | 6.6±1.6 |
| Dimethyl monocarbobenzoxy djenkolate hydrochloride. | 25 | Subcutaneous | 10 (R.R.) | 8.7±2.7 |
| Do | 25 | do | 10 (C.R.) | 5.4±1.6 |
| Do | 300 | Oral | 10 (R.R.) | 8.2±2.5 |
| Do | 300 | do | 10 (C.R.) | 4.8±1.7 |

Rats weighing from 120 to 200 grams were used. A standard volume of 0.05 ml. of dextran (6% w./v. in saline) was injected into the plantar region of the right hind paw as the edema producing agent.

The test materials were administered as solutions or suspension in 1% Tween 80 thirty minutes before the injection of dextran.

Measurements of the edema were made according to the method described by Adamkiewicz et al. (Can. J. Biochem. Physiol., 33: 332, 1955). An initial measurement of the volume of each paw was made before the injection of dextran and became the basis for the evaluation of the development of the edema at the subsequent measurements made at two hours (Peak time for the edema) and five hours (end of the experiment). The volume difference between the inflamed paws and the same paw prior to the dextran injection was taken to represent the volume of the edema.

The pooled results are set forth in Table II, which follows:

TABLE II.—ANTI-EDEMA ACTIVITY

| Compound | Dose (mg./kg.) | Route of administration | Number of animals | Volume of the edema (ml.) (±standard deviation) 2 hours | 5 hours |
|---|---|---|---|---|---|
| None (controls) | | | 49 | .71±.14 | .50±.15 |
| Monocarbobenzoxy djenkolic acid hydrochloride. | 100 | Intraperitoneal | 5 | .54±.10 | .29±.09 |
| Do | 200 | do | 5 | .62±.11 | .33±.05 |
| Do | 500 | Oral | 5 | .66±.08 | .41±.14 |
| Dimethyl monocarbobenzoxy-djenkolate hydrochloride. | 100 | Intraperitoneal | 5 | .40±.09 | .21±.08 |
| Do | 300 | Oral | 5 | .70±.03 | .55±.06 |

As is apparent from the results in the above table, the compounds of the invention are effective in reducing edema to a significant degree.

The compounds of the present invention are non-toxic in amounts required to effect sufficient reduction of inflammation and edema.

In general, while it is possible to administer the active ingredients of the present invention as pure compounds, it is preferred to incorporate said active ingredients with a suitable pharmaceutical carrier.

The preferred mode of administration is by oral route, with the active ingredient in the form of tablets or capsules. Suitable solid pharmaceutical carriers useful in the preparation of such tablets or capsules include, for example, starch, lactose, sucrose, glucose, gelatin, and the like.

The active ingredients of the invention in their free form or as their non-toxic acid salts can also be dissolved in a liquid pharmaceutical carrier, such as, for example, propylene glycol, polyethylene glycol, water, saline, and mixtures thereof, to form a solution suitable for administration by injection or for oral administration in a palatable form.

Unit dosage forms, such as tablets, capsules or injectable solutions, can contain any suitable predetermined amount of one or more of the active ingredients or of their non-toxic acid salts and may be administered as desired. Solid unit dosage forms generally contain from about 25 to about 95% by weight of one or more of the active ingredients. Liquid dosage forms generaly contain from about 0.1 gram to about 90 grams of active ingredients per 100 ml. of solution. An effective single dose of the active ingredient is generally in the range of 25 to 1,000 mg.

Although the invention has been illustrated by the preceding examples and tables, it is not to be construed as being limited thereby. Various departures may be made therefrom within the scope of the accompanying claims without departing from the principles of the invention.

What is claimed is:

1. A compound selected from the group consisting of compounds of the formula:

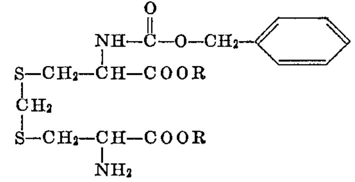

wherein R is hydrogen or methyl, and their non-toxic acid salts.

2. The compound of claim 1 wherein R is hydrogen.

3. The hydrochloride salts of the compound of claim 2.

4. The compound of claim 1 wherein R is methyl.

5. The hydrochloride salts of the compound of claim 4.

References Cited

Armstrong et al., J. Biol. Chem., 168, 373 (1947).

JAMES A. PATTEN, *Primary Examiner.*

EDWARD GLEIMAN, *Assistant Examiner.*

U.S. Cl. X.R.

424—286, 300